United States Patent
Jung et al.

(10) Patent No.: US 10,179,561 B2
(45) Date of Patent: Jan. 15, 2019

(54) GAS GENERATOR FOR A VEHICLE OCCUPANT SAFETY SYSTEM, AIRBAG MODULE AND VEHICLE OCCUPANT SAFETY SYSTEM COMPRISING A GAS GENERATOR OF THIS TYPE, AND PRODUCTION METHOD

(71) Applicant: TRW Airbag Systems GmbH, Aschau a. Inn (DE)

(72) Inventors: Christian Jung, Mühldorf (DE); Achim Hoffmann, Tüßling (DE); Michael Gabler, Mühldorf (DE); Andreas Tischer, Zangberg (DE)

(73) Assignee: TRW Airbag Systems GmbH (DE)

( * ) Notice: Subject to any disclaimer, the term of this patent is extended or adjusted under 35 U.S.C. 154(b) by 34 days.

(21) Appl. No.: 15/328,539

(22) PCT Filed: Jul. 27, 2015

(86) PCT No.: PCT/EP2015/001540
§ 371 (c)(1),
(2) Date: Jan. 24, 2017

(87) PCT Pub. No.: WO2016/015852
PCT Pub. Date: Feb. 4, 2016

(65) Prior Publication Data
US 2017/0210332 A1    Jul. 27, 2017

(30) Foreign Application Priority Data
Jul. 28, 2014    (DE) .................. 10 2014 010 942

(51) Int. Cl.
*B60R 21/26*    (2011.01)
*B60R 21/264*    (2006.01)
(Continued)

(52) U.S. Cl.
CPC ...... *B60R 21/2644* (2013.01); *B01D 46/2403* (2013.01); *B22F 3/1055* (2013.01);
(Continued)

(58) Field of Classification Search
CPC .................................................. B60R 21/2644
See application file for complete search history.

(56) References Cited

U.S. PATENT DOCUMENTS

| | | | |
|---|---|---|---|
| 5,483,896 A | 1/1996 | Hock et al. | |
| 5,527,067 A * | 6/1996 | Iwai | B60R 21/2644 |
| | | | 102/531 |

(Continued)

FOREIGN PATENT DOCUMENTS

| | | |
|---|---|---|
| DE | 9013129.0 | 1/1991 |
| DE | 102008049652 | 4/2010 |
| WO | 2009146221 | 3/2009 |

OTHER PUBLICATIONS

Anthony Sebastian, NASA article Resurrects it most Powerful Rocket Engine after 40 years, for Science!

*Primary Examiner* — Nicole T Verley
(74) *Attorney, Agent, or Firm* — Tarolli, Sundheim, Covell & Tummino LLP (57) ABSTRACT

The invention relates to a gas generator (10) for a vehicle occupant safety system comprising an outer casing (20) and a filter structure (30) for purifying and/or cooling gas released inside the outer casing (20), wherein the filter structure (30) is integrated in the outer casing (20). The invention further relates to an airbag module and a vehicle occupant safety system comprising said gas generator as well as to a manufacturing method.

21 Claims, 5 Drawing Sheets

(51) Int. Cl.
*F42B 3/04* (2006.01)
*B01D 46/24* (2006.01)
*B33Y 10/00* (2015.01)
*B33Y 50/02* (2015.01)
*B33Y 70/00* (2015.01)
*B33Y 80/00* (2015.01)
*B22F 3/105* (2006.01)
*B28B 1/00* (2006.01)
*B41F 15/02* (2006.01)
*B29C 64/165* (2017.01)
*B29C 64/386* (2017.01)
*B29L 31/30* (2006.01)

(52) U.S. Cl.
CPC .......... *B28B 1/001* (2013.01); *B29C 64/165* (2017.08); *B29C 64/386* (2017.08); *B33Y 10/00* (2014.12); *B33Y 50/02* (2014.12); *B33Y 70/00* (2014.12); *B33Y 80/00* (2014.12); *B41F 15/02* (2013.01); *F42B 3/04* (2013.01); *B01D 2279/10* (2013.01); *B22F 2003/1057* (2013.01); *B29L 2031/30* (2013.01); *B60R 2021/26011* (2013.01); *B60R 2021/26029* (2013.01); *B60R 2021/26076* (2013.01); *B60R 2021/26082* (2013.01)

(56) References Cited

U.S. PATENT DOCUMENTS

| | | | | |
|---|---|---|---|---|
| 5,531,474 A * | 7/1996 | Osborne | B60R 21/2644 | 102/531 |
| 5,753,852 A * | 5/1998 | Bernau | B60R 21/2644 | 102/530 |
| 5,816,612 A | 10/1998 | Faigle et al. | | |
| 6,089,598 A * | 7/2000 | Snyder | B01D 46/0049 | 280/740 |
| 6,170,869 B1 * | 1/2001 | Tomiyama | B60R 21/2644 | 280/741 |
| 6,189,924 B1 * | 2/2001 | Hock | B60R 21/217 | 280/736 |
| 6,997,476 B2 * | 2/2006 | Kayser | B60R 21/26 | 280/740 |
| 7,172,214 B2 * | 2/2007 | Matsuda | B01D 46/2403 | 280/741 |
| 7,175,197 B2 * | 2/2007 | Iwai | B60R 21/2644 | 280/736 |
| 7,350,810 B2 * | 4/2008 | Blessing | B60R 21/2644 | 280/736 |
| 7,427,082 B2 * | 9/2008 | Schoenhuber | B60R 21/26 | 280/736 |
| 7,597,353 B2 * | 10/2009 | Smith | B60R 21/2644 | 280/736 |
| 7,651,129 B2 * | 1/2010 | Nakayasu | B60R 21/2644 | 280/741 |
| 7,850,201 B2 * | 12/2010 | Kubo | B60R 21/2644 | 280/741 |
| 7,883,111 B2 * | 2/2011 | Blessing | B60R 21/2644 | 102/530 |
| 8,328,234 B2 * | 12/2012 | Chen | B60R 21/2644 | 280/741 |
| 8,556,294 B1 * | 10/2013 | Norman, III | B60R 21/263 | 102/531 |
| 8,585,792 B2 * | 11/2013 | Zengerle | B01D 39/12 | 242/360 |
| 8,910,364 B2 * | 12/2014 | Overton | B21D 39/00 | 280/740 |
| 9,328,559 B2 * | 5/2016 | Schwarz | E21B 4/06 | |
| 9,487,183 B2 * | 11/2016 | Bierwirth | B60R 21/2644 | |
| 9,511,738 B2 * | 12/2016 | Bierwirth | B60R 21/261 | |
| 9,623,834 B1 * | 4/2017 | Quioc | B60R 21/264 | |
| 9,643,564 B2 * | 5/2017 | Bierwirth | B60R 21/261 | |
| 9,815,431 B2 * | 11/2017 | Bierwirth | B60R 21/261 | |
| 9,840,224 B2 * | 12/2017 | Bierwirth | B60R 21/261 | |
| 9,873,403 B2 * | 1/2018 | Spencer | B60R 21/264 | |
| 2003/0173075 A1 * | 9/2003 | Morvant | E21B 43/08 | 166/230 |
| 2006/0119087 A1 * | 6/2006 | Blessing | B60R 21/2644 | 280/736 |
| 2006/0254454 A1 | 11/2006 | Bierwirth | | |
| 2008/0272581 A1 | 11/2008 | Woo | | |
| 2012/0326423 A1 * | 12/2012 | Hoffman | B01D 45/08 | 280/741 |
| 2014/0290523 A1 * | 10/2014 | Yano | B60R 21/2644 | 102/530 |
| 2016/0229372 A1 * | 8/2016 | Spencer | B60R 21/264 | |
| 2017/0292507 A1 * | 10/2017 | Staples | F04B 33/005 | |
| 2018/0069352 A1 * | 3/2018 | Summers | H01R 13/7032 | |

* cited by examiner

GAS GENERATOR FOR A VEHICLE OCCUPANT SAFETY SYSTEM, AIRBAG MODULE AND VEHICLE OCCUPANT SAFETY SYSTEM COMPRISING A GAS GENERATOR OF THIS TYPE, AND PRODUCTION METHOD

RELATED APPLICATIONS

This application corresponds to PCT/EP2015/001540, filed Jul. 27, 2015, which claims the benefit of German Application No. 10 2014 010 942.9, filed Jul. 28, 2014, the subject matter of which are incorporated herein by reference in their entirely.

BACKGROUND OF THE INVENTION

The invention relates to a gas generator according to the preamble of claim 1. The invention further relates to an airbag module and a vehicle occupant safety system comprising such gas generator. Moreover, the invention deals with a method of manufacturing a gas generator component.

A gas generator of the afore-mentioned type is known from DE 20 2005 007 611 U1, for example. The known gas generator includes an outer casing having gas outlet openings. Within the outer casing gas-generating moans, for example in the form of pellets, are arranged which release gas by the action of pressure and/or heat. Within the outer casing moreover a filter structure is arranged through which the expanding gas flows on its way to the gas outlet opening. The filter structure serves for purifying and/or cooling the released gas. Filter structures of this kind are usually formed of wire mesh or knitted wire, wherein the individual wires of the wire mesh or knitted wire may have different wire diameters.

In general, when developing gas generators there is a need for weight reduction. At the same time, the size of the gas generator is to be reduced without impairing the efficiency thereof as regards generation of a sufficient gas volume. In the known gas generator, there is a distance between the filter structure and the outer casing which counteracts the aim of designing an as compact gas generator as possible. Moreover, known gas generators generally have a complex structure.

SUMMARY OF THE INVENTION

It is the object of the invention to state a gas generator for a vehicle occupant safety system which is compact and has a simple structure. It is another object of the invention to state an airbag module and a vehicle occupant safety system comprising such gas generator. Moreover, it is the object of the invention to state a method of manufacturing gas generator components.

In accordance with the invention, this object is achieved with respect to the gas generator by the subject matter of claim 1, with respect to the airbag module by the subject matter of claim 14, with respect to the vehicle occupant safety system by the subject matter of claim 15 and with respect to the manufacturing method by the subject matter of claim 16.

Especially, the invention is achieved by a gas generator for a vehicle occupant safety system including an outer casing and a filter structure for purifying and/or cooling a gas released inside the outer casing. According to the invention, the filter structure is integrated in the outer casing.

By forming the filter structure integrally with the outer casing, on the one hand the volume of the gas generator is reduced in total. On the other hand, the integrated combination of the outer casing and the filter structure results in weight saving. Finally, in this way the constructional design of the gas generator is simplified, as an additional filter structure may be dispensed with. This also has a positive effect on the manufacturing process, as a step of joining a filter structure to an outer casing is saved.

The afore-mentioned object is moreover achieved by a gas generator in which at least one gas generator component, especially an outer casing and/or an ignition unit of the gas generator, are manufactured by a 3-D printing method, especially a 3-D screen printing method. The gas generator whose at least one gas generator component is manufactured by a 3-D screen printing method may further include the afore-mentioned features as regards the filter structure integrated in the outer casing, in an especially preferred embodiment, the outer casing of the gas generator is provided to simultaneously farm a filter structure, wherein the outer casing is manufactured by the 3-D printing method, especially the 3-D screen printing method.

The 3-D printing method allows for especially simple manufacture of gas generator components, especially when the gas generator components have a structurally complex design. This applies, for example, to the outer casing which is simultaneously configured as filter structure. The manufacture by the 3-D printing method enables, in an especially simple manner, the filter structure to be integrated in the outer casing. Although the structural design of the outer casing and, resp., of the gas generator component manufactured by the 3-D printing method in general may be relatively complicated, in total a reduction of the complexity of the entire gas generator is resulting, however, which has a positive effect on the assembly of the gas generator.

In accordance with a preferred embodiment of the gas generator according to the invention, the filter structure includes channels, in particular mazelike or meandering channels extending through the outer casing. The mazelike or meandering channels on the one hand effectuate filtering of slag or particles from the released gas in a simple and efficient manner. On the other hand, the mazelike or meandering shape of the channels provides an especially large surface with released gas flowing around the same, in this way, efficient heat exchange takes place between the filter structure and the released gas which is properly cooled in this manner.

According to the invention, the filter structure is integrated in the outer casing and forms an integral part of the outer casing, respectively. By way of example it is additionally outlined that the filter structure may be formed integrally with the outer casing. Especially, the integral formation of the filter structure with the outer casing may be produced by the 3-D printing method. Due to the configuration in one piece of the filter structure and the outer casing, material thicknesses can be reduced in total without having to accept structural drawbacks. As a consequence, weight reduction of the gas generator is obtained. At the same time, the volume of the gas generator and the outer volume of the gas generator may be reduced without impairing the inner volume of the gas generator.

In a further preferred embodiment of the invention, the outer casing has a cylindrical and/or polygonal circumferential wall in which the filter structure is formed. The cylindrical circumferential wall may be integrated in the outer casing in one piece. For example, the outer casing may further include a cover and a bottom each being formed integrally with the circumferential wall. Preferably the filter structure extends exclusively in the circumferential wall of the outer casing.

In concrete exemplary configurations, the circumferential wall may include oppositely arranged plate elements having a planar outer surface end a ribbed inner surface. The ribbed inner surfaces preferably are arranged to face each other. The ribbed inner surfaces may form part of the mazelike or meandering channels. In this respect, the integration of ribbed inner surfaces in the circumferential wall constitutes a constructional simplification and especially serves for the compact design of the gas generator.

Preferably, the circumferential wall includes land elements of two-sided rib structure which are arranged between the ribbed inner surfaces of the plate elements. The land elements, especially the two-sided rib structure thereof, may form counter-elements substantially complementary to the ribbed inner surface of the plate elements. The two-sided rib structure equally serves for increasing the heat exchanging surface when a released gas flows through the circumferential wall. Thus the cooling effect is increased.

Further, the land elements may be arranged offset in the circumferential direction relative to the plate elements and may extend through each of the gas outlet openings of the circumferential wall. In general, the circumferential wall may be provided to have gas outlet openings. In order to prevent released gas from leaving the gas generator immediately through the gas outlet openings without being filtered or cooled before, it is provided to arrange land elements in the gas outlet openings. This causes the released gas to flow around the land elements so that an as large surface as possible is utilized for heat exchange between the released gas and the circumferential wall.

In a preferred embodiment of the gas generator according to the invention the rib structure of the land elements engages rack-like in the ribbed inner surfaces of the plate surfaces. Specifically, the rib structure may engage in the ribbed inner surfaces of the plate elements such that released gas may flow around individual ribs of the land elements and the plate elements. Especially between the individual ribs of the land elements and the plate elements a distance forming the meandering or mazelike channel may be provided through which distance the released gas flows when passing the circumferential wall.

In preferred configurations, the invention provides that the outer casing has plural ring segments forming the circumferential wall when they are coaxially superimposed. The ring segments may be formed integrally with each other. Especially, the ring segments may be integrally put on top of each other by means of the 3-D printing method, for example by layered printing of individual material layers. The individual ring segments may also be manufactured separately and may then be composed to form the circumferential wall. In both alternatives, it is substantially provided that the circumferential wall can be divided into plural ring segments by transversely extending separation trays. Each of the mazelike or meandering channels extending through the circumferential wall preferably extends in the direction of the longitudinal axis of the outer casing between two separation trays. In the direction of the longitudinal axis, the channels may have a straight extension. The mazelike or meandering structure rather shows in the cross-section of the circumferential wall, i.e. in a cylindrical circumferential wall in the radial direction.

The present invention further deals with a gas generator which is adapted to include especially the afore-mentioned features and in addition includes a tamping formed integrally with the outer casing. The gas generator in general may comprise an outer casing having gas outlet openings. The gas outlet openings are closed by the tamping formed integrally with the outer casing. Said gas generator is preferably manufactured by a 3-D printing method as well.

Especially the manufacture by a 3-D printing method allows forming a tamping which is integrated in the outer casing in one piece. It is the function of the tamping to close gas outlet openings so as to prevent dirt and moisture from penetrating the gas generator. This ensures that the gas generator is ready for a singular use even over a quite long period of time. This means that the gas generator sometimes will idle in a vehicle occupant safety system for several years before the gas generator has to fulfill its safety function relevant to the vehicle occupants. It is important in this context that the reliability of the gas generator remains guaranteed. Apart from further components, the tamping constitutes a substantial aspect for the reliability of the functioning of the gas generator, as the tamping prevents moisture or impurities from penetrating.

The tamping may be formed by an area of reduced wall thickness of the circumferential wall. Such area of reduced wall thickness can be manufactured especially easily by a 3-D printing method. It is preferably provided to dimension and configure the area of reduced wall thickness such that a gas pressure built up in the gas generator and, resp., in the outer casing is sufficient to cause bursting of the tamping and to release the gas flow. This function has to be guaranteed even when the gas outlet opening, as provided in preferred embodiments of the invention, is interspersed with and, resp., blocked by land elements which have to be passed for releasing the released gas.

In addition, in preferred embodiments of the invention the gas generator may be provided to include a retaining flange formed integrally with the outer casing. The retaining flange is manufactured especially integrally with the outer casing by the afore-mentioned 3-D printing method. The retaining flange allows mounting the gas generator on further components of a vehicle, for example on or in an airbag module and/or on a steering wheel armature. The retaining flange may extend radially outside the circumferential wall. Especially, the outer casing may form a hat-shaped cross-sectional profile at least in portions with the retaining flange.

An independent aspect of the invention relates to a gas bag module, especially an airbag module, comprising an afore-described gas generator. Further, according to an independent aspect the invention relates to a vehicle occupant safety system including an afore-mentioned gas generator and/or an afore-described airbag module.

Moreover, the invention provides a method of manufacturing a gas generator component, especially a gas generator and/or an airbag module, in which the gas generator component is structured in layers by means of a 3-D printing method. The method according to the invention serves for manufacturing a gas generator component, wherein the gas generator component may be part of a gas generator and/or of an airbag module. Especially, the gas generator component may be an outer casing and/or an ignition unit of a gas generator which is composed in layers by means of a 3-D printing method.

The use of a 3-D printing method, especially a 3-D screen printing method for manufacturing gas generator components is also explicitly disclosed.

The advantages of the manufacturing method according to the invention especially reside in the fact that the structural design of gas generator components, especially individual components of a gas generator, can be more complex, which enables a filter structure to be integrated in the outer casing of a gas generator, for example. Furthermore, materials having high stability with low weight can be processed by the 3-D printing method.

The 3-D printing method permits a very precise construction of the gas generator component so that sufficient strength of the gas generator component can be obtained with simultaneously low mass. The 3-D printing method moreover is easily reproducible so that high accuracy is achieved also throughout a whole component series or component batch. Furthermore, the 3-D printing method is easily scalable, which renders this manufacturing method properly suited for series production.

Since the 3-D printing method constitutes a material-composing method, waste products as they occur in material-removing methods, for example, are avoided. The manufacturing method according to the invention therefore is beneficial not only in the economic but also in the ecological respect. Moreover, the 3-D printing method also permits producing cavities and, resp., hollows in components.

In a preferred embodiment of the manufacturing method according to the invention, the 3-D printing method is a 3-D screen printing method. This method excels by especially high accuracy having a resolution of approx. 100 µm.

The method according to the invention may comprise the following steps in preferred configurations:
 providing a screen print mask;
 applying a printable suspension of a material powder to the screen print mask; and
 heating the printable suspension for melting the material powder.

The step of applying a printable suspension of material powder to the screen print mask may be carried out especially under pressure and, resp., under the effect of pressure. In this way, the material powder suspension is properly pressed through the screen print mask so that the suspension is deposited in a structured manner onto an afore-prepared layer. Preferably the first layer to be printed is deposited on a substrate which is removed after melting the material powder.

In accordance with a preferred embodiment of the invention, at least two material powders different torn each other are applied to the screen print mask so that two components of the gas generator component including materials different from each other are manufactured in a joint method step. The 3-D printing method, especially the 3-D screen printing method, allows manufacturing of complex gas generator components composed of plural components, wherein the individual components comprise different materials. For example, an ignition unit of a gas generator may be manufactured by 3-D screen printing, wherein a first component made from a quartz sand powder, for instance, and a second component made from a metal powder, for instance, are simultaneously composed by printing in layers. In this way two components, possibly integrated in each other, of different materials, for instance glass and metal, may be composed in layers in one process.

In concrete configurations of the manufacturing method according to the invention, the different material powders are a metal powder for manufacturing electrically conductive components, on the one hand, and a quartz sand powder or plastic powder for manufacturing an insulation member, on the other hand. The electrically conductive components may be, for example, contact pins for establishing electric contact between an ignition unit and a control unit. The insulation member may be made from glass or plastic, for instance, and may sheath the electric contact pins so as to insulate the outer casing of the gas generator against the electric contact pins or insulate the contact pins against each other.

BRIEF DESCRIPTION OF THE DRAWINGS

Hereinafter the invention shall be illustrated in detail by way of exemplary configurations with reference to the enclosed schematic drawings, in which.

DESCRIPTION

Figure 1A:
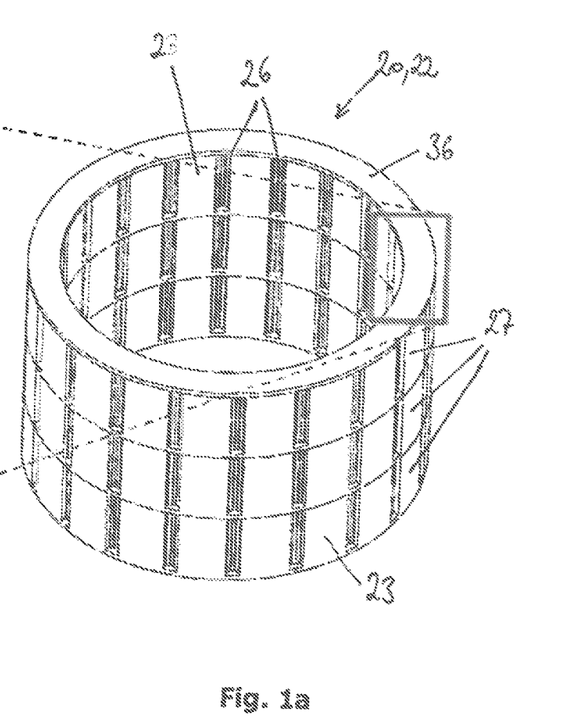
FIG. 1a is a perspective view of an outer casing of a gas generator according to the invention in accordance with a preferred embodiment.

FIG. 1a shows a perspective view of an outer casing 20 for a gas generator, especially for a pyrotechnical gas generator, 10. The outer casing 20 supports an integrated filter structure 30 which filter structure 30 is suited for cooling and/or purifying gas released inside the outer casing 20 when it flows out of the pyrotechnical gas generator 10. Specifically, slag or particles can be deposited and, resp., filtered out of the gas by the filter structure 30.

Figure 4:
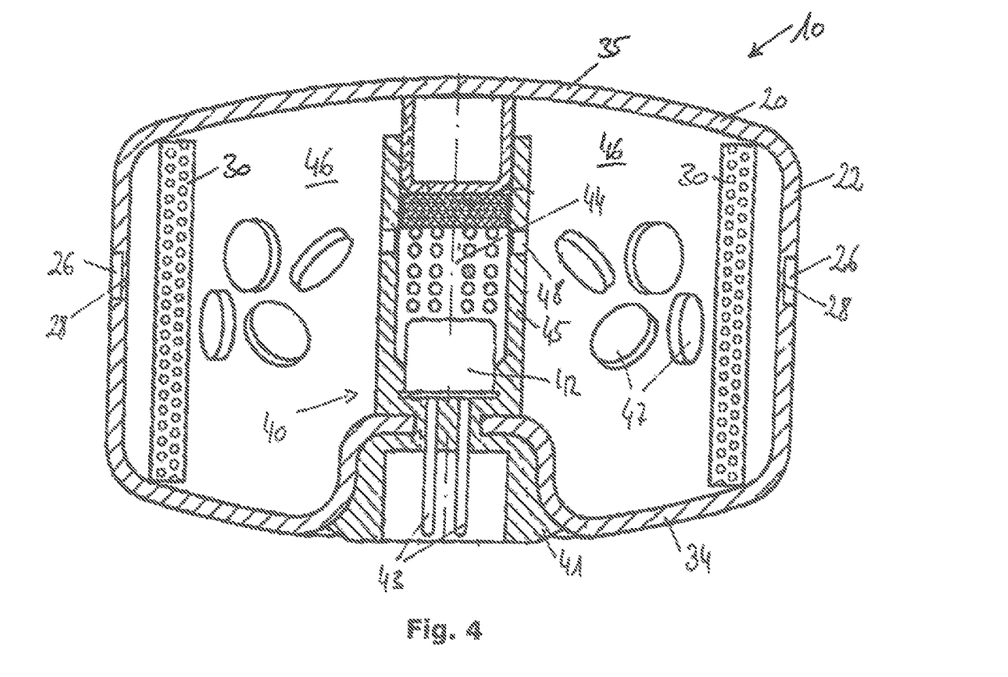
FIG. 4 is a cross-sectional view of a gas generator according to the invention in accordance with another preferred embodiment, wherein the gas outlet openings in an outer casing of the gas generator are closed by a tamping formed integrally with the outer casing.

Concretely speaking, FIG. 1a illustrates a cylindrical circumferential wall 22 of the outer casing 20. In general, further wall elements may be formed integrally with the circumferential wall 22 so as to form the outer casing 20. The outer casing 20 may further have a bottom 34 and/or a cover 35, for example, with each of the bottom 34 and the cover 35 covering and, resp., closing an axial end face of the cylindrical circumferential wall 22. An example of a completely closed outer casing 20 is shown in FIG. 4.

The filter structure 30 is formed by plural channels 21 extending through the circumferential wall 22. The channels are formed to be substantially mazelike or meandering so that the gas flowing through the circumferential wall 22 covers a relatively large distance. The course of the gas flow is exemplified in FIG. 1b by respective arrows.

Figure 1B:
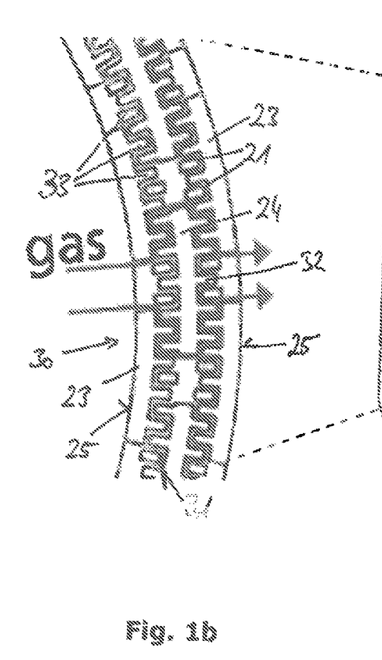
FIG. 1b is a detailed view of the outer casing according to FIG. 1.

The channels 21 are confined by meshing ribs 33 which are arranged in different components of the circumferential wall 22. The circumferential wall 22 includes plural plate elements 23 extending over the outer periphery of the circumferential wall 22. The plate elements 23 are curved so that in total a smooth cylindrical outer circumferential surface of the circumferential wall 22 is formed. On their inner surface 31 the plate elements 23 include ribs 33. Each of the ribs 33 has a substantially rectangular cross-sectional profile and extends over the entire height of the plate element 23. Opposed to the outer plate elements 23, inner plate elements 23 are provided which are curved in the opposite direction in contrast to the outer plate elements 23. Especially, the inner plate elements 23 have a planar outer surface 25 which is curved so that in total a cylindrical inner circumferential surface of the circumferential wall 22 is resulting. On their inner surface 31, the inner plate elements 23 equally comprise ribs 33. The inner and outer plate elements 23 are arranged relative to each other such that the ribs 33 thereof are facing each other. In particular, the ribs 33 are aligned with each other. This applies especially in the radial direction related to the center of the circumferential wall 22.

Between the plate elements 23, especially between the inner surfaces 31 thereof, land elements 24 are further integrated in the circumferential wall 22. The land elements 24 include a two-sided rib structure 32. The rib structure 32 is formed complementary to the arrangement of the ribs 33 of the plate elements 23. The ribs 33 of the plate elements 23 thus engage in the rib structure 32. The engagement of the ribs 33 in the rib structure 32 is selected so that a gap is formed between the rib structure 32 and the engaging ribs 33. The gap preferably has a constant width and forms a flow channel and, resp., the channel 21 for the flow of gas. Both the ribs 33 and the rib structure 32 extend over the entire height of the circumferential wall 22 and over the entire height of a ring segment 27 of the circumferential wall 22.

The circumferential wall 22 may be composed of plural ring segments 27 that are superimposed and are tightly interconnected. The ring segments 27 may be integrally interconnected. In other words, the circumferential wall 22 may be formed in one piece. In any case, between individual ring segments 27 separation trays in the form of ring plates 36 are provided for subdividing the channels 21 in the longitudinal direction of the circumferential wall 22. In FIG. 1a a ring plate 36 closing the circumferential wall 22 is shown. Such ring plates 36 are preferably arranged and, resp., formed also between the individual ring segments 27.

It is further evident from FIG. 1a that the circumferential wall 22 has plural window-like gas outlet openings 26. The gas outlet openings 26 are preferably formed in the plate elements 23 and provided between the plate elements 23, respectively. In general, the gas outlet openings 26 extend completely through the circumferential wall 22. For preventing direct gas flow through the gas outlet openings 26 the land elements 24 having the rib structure 32 are arranged offset relative to the plate elements 23 so that the land elements 24 close the gas outlet openings 26 and, resp., extend through the gas outlet openings 26. In this way, the outflowing gas is forced to meander through the channels 21 before it leaves the outer casing 20 and the gas generator 10 through the gas outlet openings 26.

Figure 2:
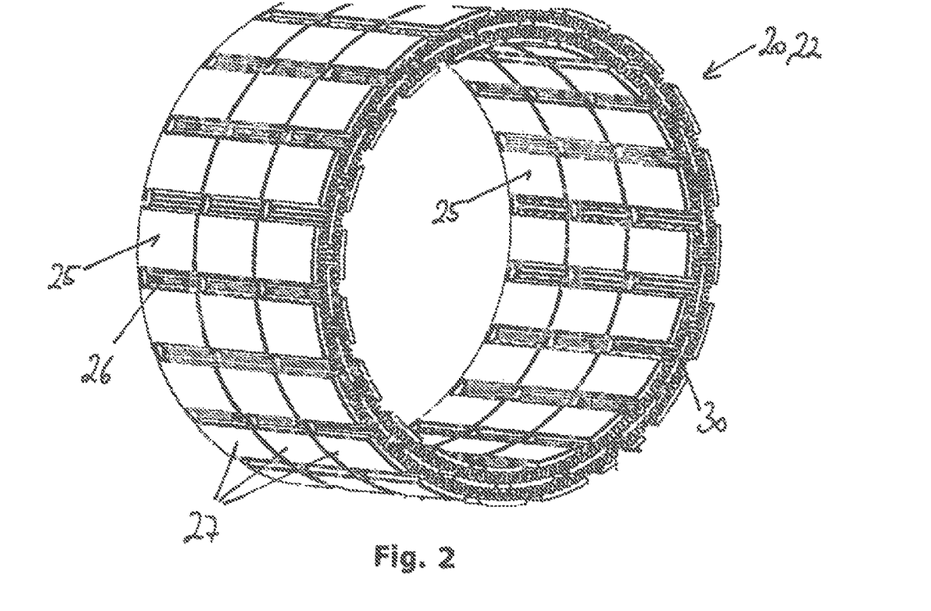
FIG. 2 is another perspective view of the outer casing according to FIG. 1, wherein the internal structure of the outer casing is visible.

In FIG. 2 another perspective view of the outer casing 20 is shown, with the upper ring plate 36 being removed. The filter structure 30 formed by plural meandering channels 21 is clearly visible. It is especially visible that the circumferential wall 22 has plural plate elements 23 which land elements 24 extending there between. Each of the plate elements 23 and the land elements 24 comprise ribs 33 and, resp., a rib structure 32 which are in mesh and thus form the channels 21.

Figure 3:
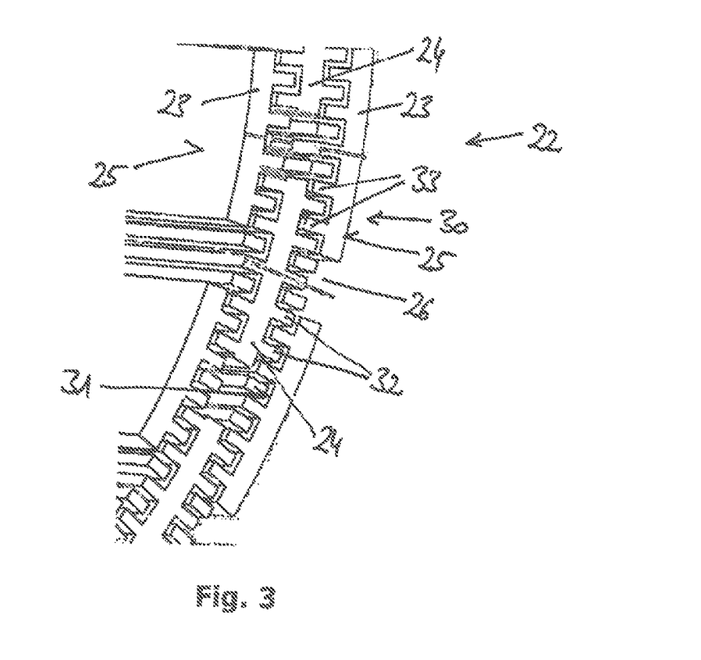
FIG. 3 is a detailed view of the outer casing according to FIG. 2.

FIG. 3 illustrates a detailed view of the outer casing 20 according to FIG. 2, likewise in perspective representation. It is clearly visible in FIG. 3 that the land elements 24 extend transversely through the gas outlet openings 26 and thus block a direct outflow path for the gas. Rather, the outflowing gas is forced to flow through the meandering channels 21. Due to the larger surface provided in this way which is passed by the gas an especially good heat exchange is obtained. Accordingly, the gas is cooled. In addition, the meandering channels 21 cause filtering of particles and/or slag from the gas so that finally purified and cooled gas flows out of the gas outlet openings 26.

FIG. 4 illustrates a cross-sectional view of a gas generator 10 comprising an outer casing 20. The outer casing 20 includes a circumferential wall 22 as well as a cover 35 and a bottom 34. In the bottom 34 an ignition unit 40 is integrated or injected. The ignition unit 40 includes an igniter 42 comprising electric contact pins 43. The electric contact pins 43 project from the outer casing and are sheathed by an insulation member 41. The igniter 42 is embedded along with the contact pins 43 especially in a plastic base 56. The igniter 42 is embedded along with the contact pins 43 preferably by injecting plastic material around the igniter 42 and the contact pins 43. During injection at the same time the ignition unit 40 is connected to the outer casing 20, especially by form fit.

The igniter 42 extends into an ignition chamber 44 in which an ignition charge may be arranged. The ignition chamber 44 is separated from a combustion chamber 46 by an inner casing 45. The combustion chamber 46 is formed substantially by the interior of the outer casing 20. A filter structure 30 may be disposed in the combustion chamber 46. In the representation according to FIG. 4, the filter structure 30 is formed separately from the outer casing 20. It is also possible to integrate the filter structure 30 into the outer casing 20, as is shown in FIGS. 1a to 3, for example.

Preferably in the combustion chamber 46 a propellant is arranged which is indicated by individual pellets 47 in FIG. 4. For triggering the gas generator an electric signal is transmitted to the igniter 42 which then ignites an ignition charge disposed in the Ignition chamber 44. A gas is formed which passes via ignition chamber openings 48 arranged in the inner casing 45 into the combustion chamber 46. There the propellant is ignited and further gas is generated which is filtered by the filter structure 30 and now acts on the outer casing 20 under pressure.

In order to discharge the gas generated in the gas generator 10, for example to an airbag, the outer casing 20 further includes gas outlet openings 26. The gas outlet openings 26 are preferably configured in the circumferential wall 22. The gas outlet openings 28 are initially closed by a tamping 28 so as to protect the propellant disposed in the combustion chamber 46 against moisture or other environmental influences. In order to release the gas it is useful to remove or eliminate the tamping 28. Usually this is done by destroying the tamping 28.

Figure 5:
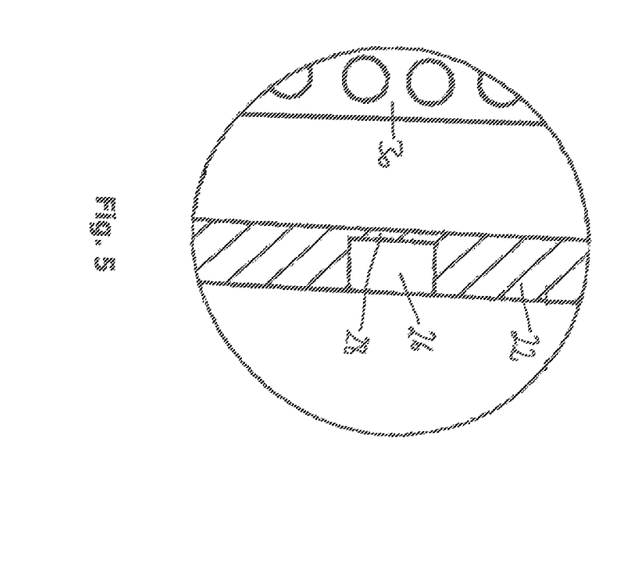
FIG. 5 is a detailed view of the gas generator according to FIG. 4.

In gas generators known so far from practice the tamping 28 is formed by a film applied to the gas outlet openings 26. The film ruptures under the influence of the gas pressure and thus releases the gas outlet openings 26. In the embodiment according to FIGS. 4 and 5, with FIG. 5 showing a detailed view of the gas outlet opening 26, it is provided, on the other hand, to form the tamping 28 integrally with the circumferential wall 22. The gas outlet opening 26 and, resp., the tamping 28 are preferably formed by an area of the circumferential wall 22 having a reduced wall thickness. In the area of the gas outlet opening 26 the circumferential wall 22 thus has a strongly reduced wall thickness, with the wall thickness in the area of the gas outlet opening 26 being dimensioned so that the circumferential wall 22 ruptures in the area of the gas outlet opening 26 as soon as the gas in the combustion chamber 46 generates a sufficiently high pressure. In other words, the tamping 28 is formed by the circumferential wall 22 itself, wherein in the area of the gas outlet opening 26 the circumferential wall 22 has a wall thickness that is smaller than outside the gas outlet opening 26. Especially the circumferential wall 22 has a pressure-stable wall thickness outside the gas outlet opening 26 and has a pressure-sensitive wall thickness inside the gas outlet opening 26.

Figure 6:
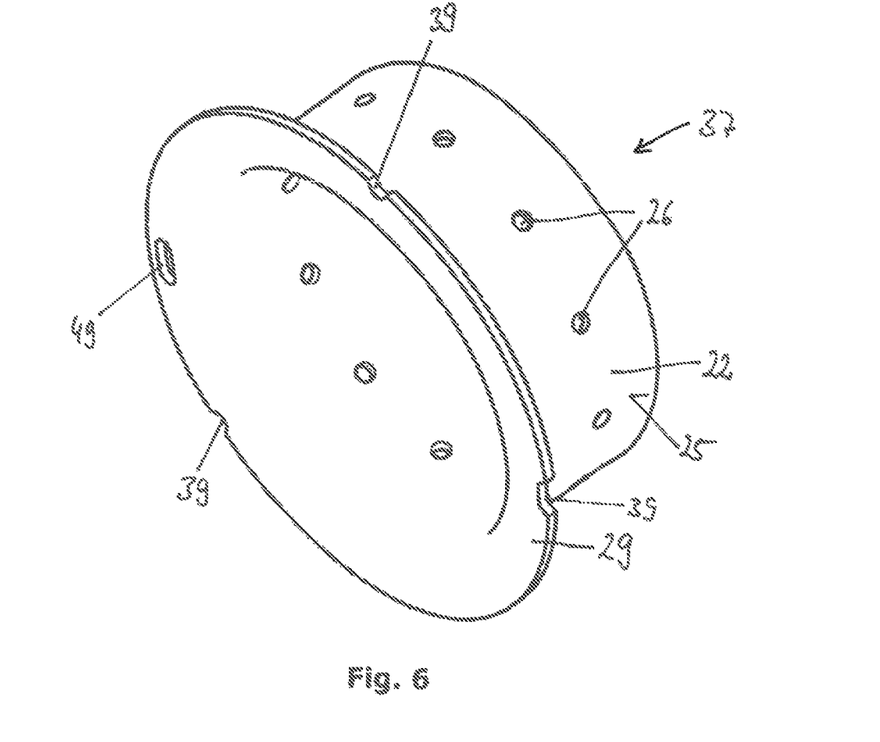
FIG. 6 is a perspective view of an outer casing of a gas generator according to the invention in accordance with another preferred embodiment, wherein a retaining flange formed integrally with the outer casing is provided.

The outer casing 20 of the gas generator 10 may be integrally formed, as exemplified in FIG. 4. Alternatively, it is possible to design the outer casing 20 in several parts, especially in two parts. An upper part 37 of the outer casing may comprise the circumferential wall 22 and the cover 35 and a lower part 38 may form the bottom 34. FIG. 6 illustrates an embodiment of an upper part 37 of an outer casing 20. The upper part 37 comprises a circumferential wall 22 including gas outlet openings 26 and a cover 35. The gas outlet openings 26 may be closed by a tamping 28 integrated in the circumferential wall 22. The tamping 28 may be formed especially integrally with the circumferential wall 22, as shown in FIGS. 4 and 5. It may be further provided that the outer casing 20, especially the circumferential wall 22, has an integrated filter structure 30 analogously to the embodiment according to FIGS. 1a to 3.

The upper part 37 according to FIG. 6 further comprises a retaining flange 29 which is annularly connected to the circumferential wall 22. The retaining flange 29 extends radially outwardly related to the longitudinal axis of the circumferential wall 22. In total, the upper part 37 of the outer casing 20 is hat-shaped and has a hat-shaped cross-sectional profile, respectively. The retaining flange 29 serves for mounting the outer casing 20 and, resp., the gas generator 10 in an airbag module.

Figure 7:
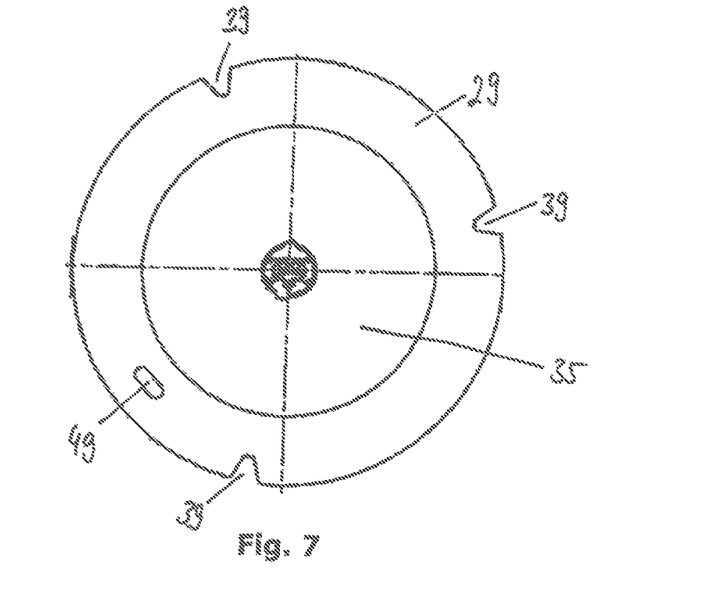
FIG. 7 is a bottom view of the outer casing according to FIG. 6.

FIG. 7 illustrates a bottom view of the upper part 37 according to FIG. 6. It is visible that the upper part 37 has plural notches 39 in the retaining flange 29. The notches 39 are substantially V-shaped and are spread irregularly along the periphery of the retaining flange 29. The notches 39 serve for aligning the upper part 37 and, resp., the entire gas generator 10 during mounting. This ensures that the gas generator 10 can be assembled at the correct orientation. Furthermore, the retaining flange 19 has a slotted hole 4 which serves for screw-fixing the gas generator 10, for example.

Figure 8:
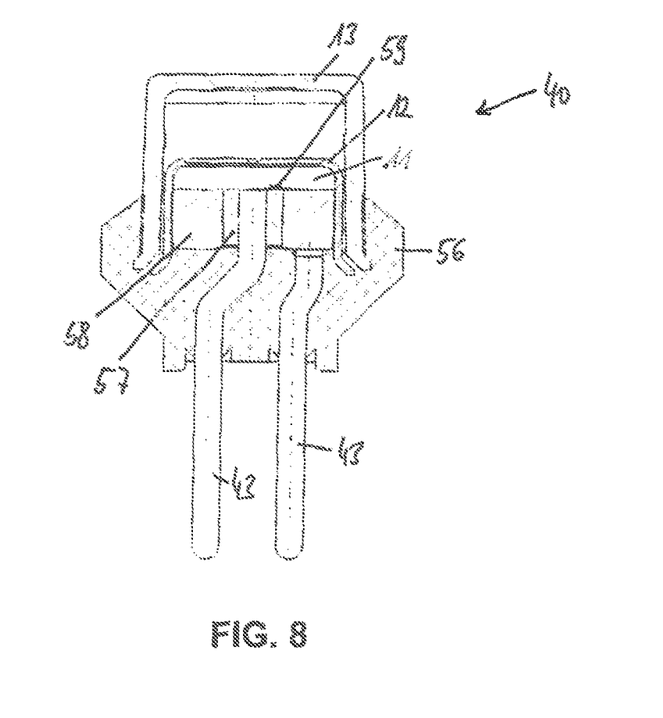
FIG. 8 is a cross-sectional view of an ignition unit of a gas generator according to a preferred embodiment, wherein the ignition unit is manufactured by a 3-D printing method.

In FIG. 8 a cross-sectional view of an ignition unit 40 is illustrated which may constitute a gas generator 10 in connection with any one of the outer casings 20 according to FIGS. 1a to 7. In particular, FIG. 8 shows an igniter 42 of the ignition unit 40. The igniter 42 has two contact pins 43 embedded in an insulation member 41. The insulation member 41 may comprise plural elements. Specifically, the insulation member 41 may have a plastic base 56 which surrounds the entire igniter 42. In addition, the insulation member 41 may comprise a pressure glazing 57 disposed between the individual contact pins 43 and a metal ring 48 so as to electrically insulate the contact pins 43 and the metal ring 58 against each other. Preferably one of the contact pins 43 is directly connected to the metal ring 58, with the metal ring 58 being insulated against the other contact pin 43 by the pressure glazing 57. Nevertheless, an electric connection between the metal ring 58 and a contact pin 43 is provided by means of a bridge wire 59 which glows upon activation and thus ignites a pyrotechnical charge 11 disposed beneath a first cap 12. A second cap 13 extends over the first cap 12 at a distance from the first cap 12. The clearance between the first cap 12 and the second cap 13 may be formed by the ignition chamber 44 and correspondingly may accommodate an ignition charge.

Figure 9:
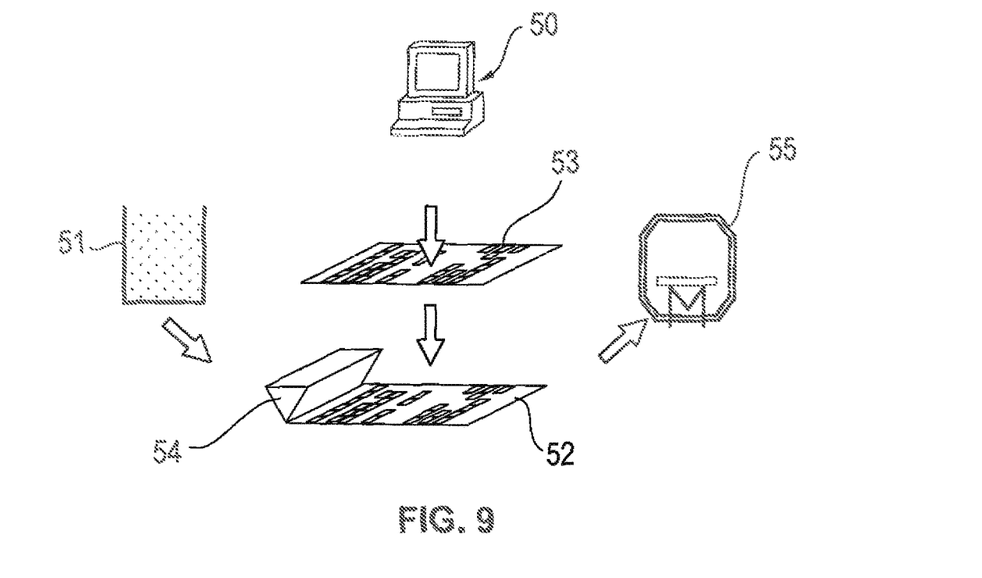
FIG. 9 is a representation of the manufacturing method according to the invention in accordance with a preferred embodiment.

In FIG. 9 a preferred manufacturing method for the outer casing 20 of a gas generator 10 is schematically shown. The preferred manufacturing method is a 3-D printing method which enables especially simple and quick manufacture of even complex structures.

The 3-D printing method preferably is a 3-D screen printing method. The starting material for the 3-D printing method is a material powder provided preferably as a suspension. The suspension on the one hand comprises the material powder and on the other hand a binder, wherein the binder may be present in liquid form. By mixing the binder with the material powder a suspension is formed which is applied via a mask to a substrate and, resp., an already printed layer located there beneath. The material powder used may be both a metal powder and a plastic powder. Other material powders are possible, If is especially imaginable to use quartz sand powder to finally manufacture a 3-D printed part from glass.

The manufacturing method starts with manufacturing a mixture of material powder and binder. The suspension of material powder and binder then is applied in layers by means of screen print. In this way, spatial structures are formed. Finally, the printed component part is subjected to heat treatment.

The material powders used preferably are metal powders, wherein especially stainless steels, copper, titanium, hard metals and generally light metals and sintered metals may be used.

In the preferred three-dimensional screen printing method, the screen print mask 52 is preferably produced directly from a CAD model 53 which CAD model 53 is produced at a CAD computer 50. A printable compound of binder and material powder is applied to the screen print mask 52 with the aid of a scraper 54 under the influence of pressure. Preferably the corresponding screen print system has a suspension reservoir 51 from which the suspension of material powder and binder can be directly taken. By repeated application of individual screen print layers, with different screen print masks 52 where appropriate, a spatial structure is produced. Said spatial structure may form the outer casing 20 of the gas generator 10, for example.

Especially the outer casing 20 may have an integrated filter structure 30, as is exemplified in FIGS. 1a to 3. It is also possible that, alternatively or additionally, the outer casing 20 includes a circumferential wall 22 comprising a tamping 28 integrated in one piece (FIGS. 4 and 5).

Moreover, the three-dimensional structure produced in screen printing may constitute an upper part 37 of an outer casing 20 having an integrally formed retaining flange 29. Finally, it is also possible to produce a three-dimensional structure forming an ignition unit 40 by screen printing. For the ignition unit 30 especially different material powders and different suspensions of material powder and binder may be used so as to simultaneously manufacture both the metal structures which are electrically conducting and the insulation member 41. Both the metal ring 58 and the contact pins 43 and the pressure glazing 57 can be manufactured by the 3-D screen printing method. The screen printing method may thus be carried out simultaneously with plural materials, for example metal and glass. In this case the pressure glazing 57 is not a pure pressure glazing but a 3-D manufactured glass member.

After composing the spatial structure in layers by screen printing a heat treatment by means of a heat source 55 is carried out so as to harden and, resp., structurally stabilize the outer casing 20 and/or a pole member comprising the metal ring 58, the (pressure) glazing 57 and the contact pins 43, for example.

In general, it is referred to the fact that the 3-D printing method described here, especially the three-dimensional screen printing method, can be used for manufacturing the outer casing 20 according to FIGS. 1 to 7 and for manufacturing the ignition unit according to FIG. 8. In particular, the embodiment according to FIGS. 1a to 3, but also the embodiment according to FIGS. 4 and 5, are disclosed in the present application even separately from the manufacturing method. In other words, the outer casing 20 according to FIGS. 1a to 3 can be manufactured both conventionally, for instance by a machining method and/or a casting method, and by means of the 3-D screen printing method. This applies mutatis mutandis to the outer casing 20 according to FIGS. 4 and 5 which is manufactured, on the one hand, by machining and/or casting, but preferably by the 3-D screen printing method which is equally described within the scope of the application.

LIST OF REFERENCE NUMERALS

10 gas generator
11 pyrotechnical charge
12 first cap
13 second cap
20 outer casing
21 channel
22 circumferential wall
23 plate element
24 land element
25 outer surface
26 gas outlet opening
27 ring segment
28 tamping
29 retaining flange
30 filter structure
31 inner surface
32 rib structure
33 rib
34 bottom
35 cover
36 ring plate
37 upper part
38 lower part
39 notch
40 ignition unit
41 insulation member
42 igniter
43 contact pin
44 ignition chamber
45 inner casing
46 combustion chamber
47 pellet
48 ignition chamber opening
49 slotted hole
50 CAD computer
51 suspension reservoir
52 screen print mask
53 CAD model
54 scraper
55 heat source
56 plastic base
57 pressure glazing
58 metal ring
59 bridge wire

The invention claimed is:

1. A gas generator (10) for a vehicle occupant safety system comprising an outer casing (20) and a filter structure (30) for purifying and/or cooling a gas released inside the outer casing (20), wherein the filter structure (30) is formed integrally with the outer casing (20), wherein the filter structure (30) includes mazelike or meandering channels (21) extending through the outer casing (20).

2. The gas generator (10) according to claim 1, wherein the outer casing (20) and/or an ignition unit (40) and/or the filter structure (30) of the gas generator (10) is manufactured by a 3-D printing method.

3. The gas generator (10) according to claim 1, wherein the outer casing (20) has a cylindrical and/or polygonal circumferential wall (22) in which the filter structure (30) is formed.

4. The gas generator (10) according to claim 3, wherein the circumferential wall (22) includes oppositely arranged plate elements (23) having a planar outer surface (25) and a ribbed inner surface (31), wherein the ribbed inner surfaces (31) are facing each other.

5. The gas generator (10) according to claim 4, wherein the circumferential wall (22) has land elements (24) with two-sided rib structure (32) which are arranged between the ribbed inner surfaces (31) of the plate elements (32).

6. The gas generator (10) according to claim 5, wherein the land elements (24) are arranged offset in the circumferential direction relative to the plate elements (23) and extend through gas outlet openings (26) of the circumferential wall (22).

7. The gas generator (10) according to claim 5, wherein, the rib structure (32) of the land elements (24) engages rack-like in the ribbed inner surfaces (31) of the plate elements (23) such that released gas may flow around individual ribs (33) of the land elements (24) and of the plate elements (23).

8. The gas generator (10) according to claim 3, wherein the outer casing (20) includes plural ring segments (27) which are coaxially superimposed to form the circumferential wall (22).

9. The gas generator (10) according to claim 1, wherein the outer casing (20) has gas outlet openings (26) which are closed by a tamping (28), and wherein the tamping (28) is formed integrally with the outer casing (20).

10. The gas generator (10) according to claim 9, wherein the tamping (28) is formed by an area of reduced wall thickness of the circumferential wall (22).

11. The gas generator (10) according to claim 1, wherein a retaining flange (29) is formed integrally with the outer casing (20) and is manufactured integrally with the outer casing (20) by a 3-D printing method.

12. An airbag module, comprising the gas generator (10) according to claim 1.

13. A vehicle occupant safety system comprising the gas generator (10) according to claim 1 and/or an airbag module comprising the gas generator (10) according to claim 1.

14. A method of manufacturing the gas generator (10) according to claim 1 and/or an airbag module comprising the gas generator (10) according to claim 1, comprising utilizing a 3-D printing method to compose the outer casing (20) and/or an ignition unit (40) of the gas generator (10) in layers.

15. The method according to claim 14, wherein the 3-D printing method is a 3-D screen printing method.

16. The method according to claim 15, wherein the 3-D screen printing method comprises:
    providing a screen print mask (52);
    applying a printable suspension of a material powder to the screen print mask (52), wherein the suspension is applied especially under pressure; and
    heating the printable suspension for melting the material powder.

17. The method according to claim 16, wherein the screen print mask (52) is produced automatically based on a computer model.

18. The method according to claim 14, wherein at least two material powders different from each other are applied to the screen print mask (52) such that two components of the gas generator (10) including materials different from each other are manufactured in a joint process step.

19. The method according to claim 18, wherein the different material powders are a metal powder for manufacturing electrically conductive components, and a quartz sand powder or plastic powder for manufacturing an insulation member (41).

20. The gas generator (10) according to claim 2, wherein the 3-D printing method is a 3-D screen printing method.

21. A gas generator (10) for a vehicle occupant safety system comprising an outer casing (20) and a filter structure (30) for purifying and/or cooling a gas released inside the outer casing (20), wherein the filter structure (30) is integrated in the outer casing (20) and includes mazelike or meandering channels (21) that extend through the outer casing (20).

* * * * *